United States Patent
Floehr

[15] 3,683,820
[45] Aug. 15, 1972

[54] AUTOMATIC HOPPER GATE LOCK

[72] Inventor: Walter L. Floehr, 1043 1/2 Nebraska Ave., Toledo, Ohio 43607

[22] Filed: Sept. 1, 1970

[21] Appl. No.: 68,602

[52] U.S. Cl..............105/282 R, 105/295, 105/301, 105/306, 105/308 R, 105/308 P
[51] Int. Cl. ........B61d 7/20, B61d 7/26, E05b 65/14
[58] Field of Search...105/282 R, 282 A, 282 P, 305, 105/308 R, 308 C, 308 E, 308 P, 308 A, 308 B, 309, 310, 424, 282 R, 295, 301, 306, 308 R, 309 P; 210/133

[56] References Cited

UNITED STATES PATENTS

| | | | |
|---|---|---|---|
| 3,596,611 | 8/1971 | Floehr | 105/282 A |
| 3,433,178 | 3/1969 | Floehr | 105/282 R |
| 3,066,618 | 12/1962 | Gunnison | 105/305 X |
| 3,035,530 | 5/1962 | Meyers et al. | 105/282 R X |
| 2,035,530 | 3/1936 | Burckhalter et al. | 210/133 |
| 2,386,702 | 10/1945 | McBride | 105/282 P |
| 2,638,060 | 5/1953 | Dorey | 105/282 P |
| 2,646,006 | 7/1953 | Dorey | 105/305 X |
| 2,738,739 | 3/1956 | Dorey | 105/305 X |
| 3,472,178 | 10/1969 | Floehr | 105/424 X |
| 3,485,183 | 12/1969 | Floehr | 105/282 R |

Primary Examiner—Arthur L. La Point
Assistant Examiner—Howard Beltran
Attorney—Wilmer Mechlin

[57] ABSTRACT

An automatic locking mechanism for a cable drive discharge gate, in which a counterweighted cam is positionable in the path of movement of the operating shaft of the cable drive between open and closed positions and trippable by the shaft in opening and closing movements of the gate for automatically locking the gate in closed position.

7 Claims, 4 Drawing Figures

Inventor:
Walter L. Floehr
By Wilmer Mechlin
his Attorney

Inventor:
Walter L. Floehr
By Wilmer Mechlin
his Attorney

AUTOMATIC HOPPER GATE LOCK

BACKGROUND OF THE INVENTION

Among the several prior Floehr patents on cable drive discharge gates, beginning with U.S. Pat. No. 3,433,178, issued on Mar. 18, 1969, U.S. Pat. Nos. 3,472,178 and 3,485,183 disclose means for positively locking such a gate in closed position. However, in each of these patents the locking mechanism acts against a capstan on or bushing journalling the operating shaft and is both lockable and unlockable manually. By contrast, Meyers U.S. Pat. No. 3,035,530, issued May 22, 1962, discloses a locking mechanism for a hopper discharge gate having as its locking element a counterweighted, so-called "cam", fixed by a stop in its locking position and purportedly capable of automatically locking the gate in closed position at the end of a closing operation but depending on support of part of the cam on the gate during opening and closing movements thereof for "automatic" locking. It is with a discharge gate locking mechanism automatically locking when the gate is closed and not dependent for such operation on location by the gate, that the present invention is primarily concerned.

SUMMARY OF THE INVENTION

The primary object of the present invention is to provide an improved locking mechanism for a cable drive hopper discharge gate, which, while requiring manual unlocking, is positive in operation in automatically locking the gate in closed position without dependence for location for automatic operation upon engagement with the gate during the opening and closing movements thereof.

Another object of the invention is to provide an improved locking mechanism for a cable drive hopper discharge gate, wherein the locking device is a counterweighted cam actuated for locking the gate against opening and for tripping to locking position by engagement with the gate's operating shaft and free of the shaft and any portion of the gate except during tripping and locking.

Other objects and features of the invention will appear hereinafter in the detailed description, be particularly pointed out in the appended claims and be illustrated in the accompanying drawings, in which:

FIGURE DESCRIPTION

Figure 1:
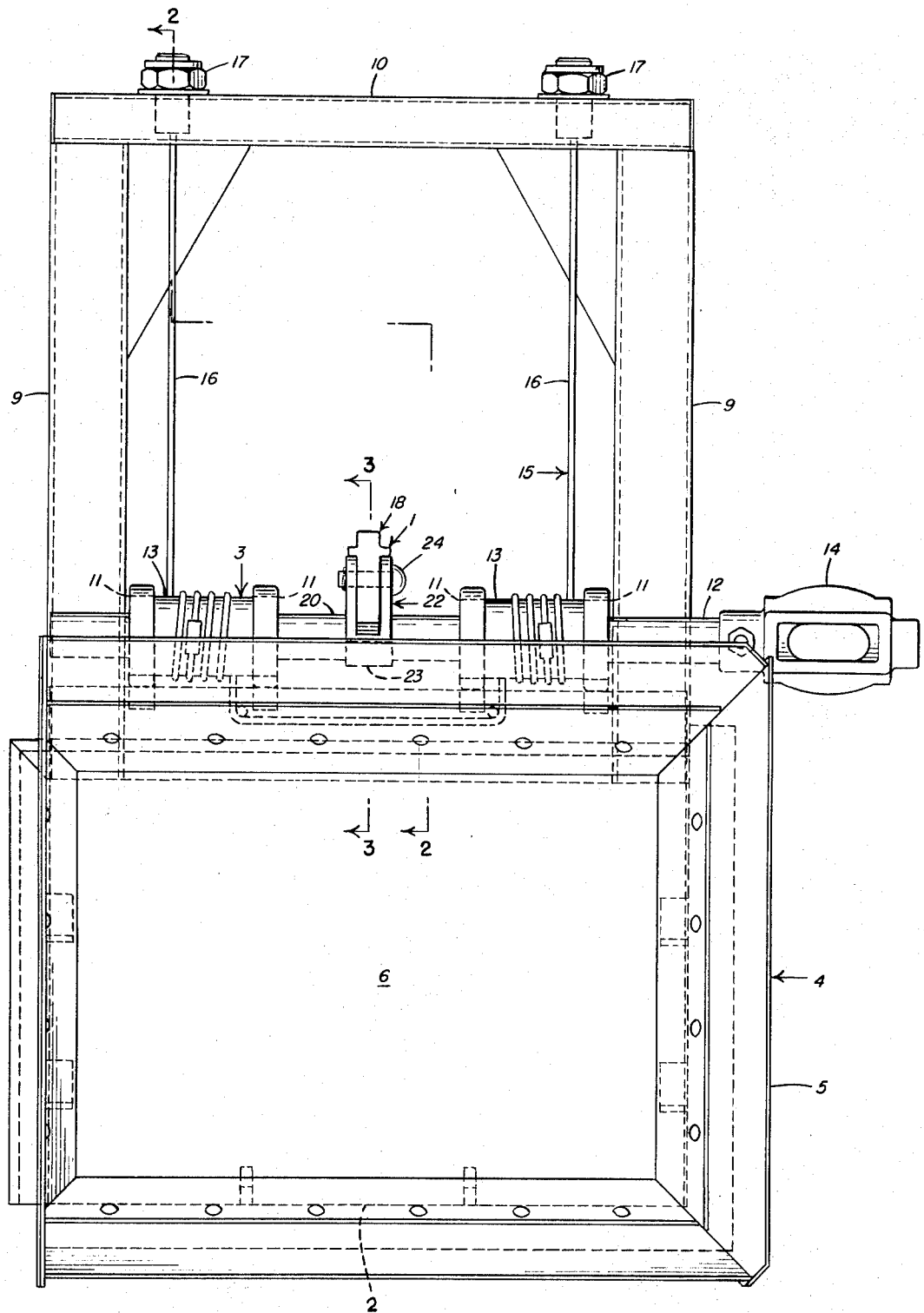
FIG. 1 is a plan view of a cable drive hopper discharge gate assembly incorporating a preferred embodiment of the improved mechanism of the present invention.

Referring now in detail to the drawings in which like reference characters designate like parts, the improved discharge gate operating mechanism 1 of the present invention is designed for use with a discharge gate 2 driven between open and closed positions by a cable drive 3 and has been so illustrated as exemplary of the invention.

Except in the locking mechanism 1, the illustrated cable drive discharge gate assembly 4 is similar to the discharge gate assemblies shown in the Floehr patents hereinbefore listed in mounting the discharge gate 2 for horizontal or rectilinear sliding between open and closed positions in a gate frame 5 bounding a discharge opening 6 and fixed to a downwardly discharging hopper 7 of a railway hopper car (not otherwise shown). The illustrated assembly incorporates a sealing gasket 8 such as disclosed in my copending application Ser. No. 772,935, filed Nov. 4, 1968, now U.S. Pat. No. 3,596,611, issued Aug. 3, 1971 for automatically sealing between the gate 2 and the frame 5 in the gate's closed position, and has extending forwardly from the frame laterally spaced parallel guide rails 9 connected at their distal ends by a cross bar 10.

For driving the gate 2 between open and closed positions, there are fixed to the front or outer end of the gate adjacent opposite sides thereof, laterally or axially spaced, forwardly or outwardly extending pairs of bearings or bushings 11 journalling or rotatably mounting an operating shaft 12, with the bearings of each pair axially or laterally spaced and straddling a drum or reel 13 fixed to the shaft. Beyond or outwardly of the pairs of bearings 11, the shaft 12 rides or rolls on the guide rails 9 and, as preferred, has fixed to each, or, as illustrated, one end, laterally beyond the adjoining rail, a capstan or operating head 14, for enabling the shaft to be rotated or turned by a suitable turning tool (not shown). To translate the rotary motion imparted to the shaft 12 through the capstan 14 into rectilinear motion of the discharge gate 2, a U-shaped drive cable 15 looped at the rear for anchoring to the frame 5, has each leg 16 intermediate its ends wrapped or wound around one of the drums 13 and the front ends of the legs adjustably connected, as by clamps 17, to the cross bar 10 for adjusting the tension of the cable. With this construction, rotation of the operating shaft 12 in one direction or the other will cause the drums 13 to wind themselves in the corresponding direction along the cable legs 16 and move or shift the gate in the same opening or closing direction relative to the gate frame 5.

Applied to the above-described cable drive gate 2, the improved locking mechanism 1 is comprised of a pawl, dog or cam 18 mounted for vertical swinging or pivoting forwardly of or beyond the front wall 19 of the frame 5. Preferably substantially centered laterally between the guide rails and confronting the center portion 20 of the operating shaft 12, the pawl 18 suitably is mounted between laterally spaced, forwardly and downwardly projecting arms 21 of a mounting bracket 22 fixed or secured at its base 23 to the frame's front wall 19 and pivots on a pivot pin 24 extending between the arms adjacent their front ends.

Generally triangular and flat-sided, the pawl 18 has on opposite sides of its pivotal axis a cam or body portion 25 and an outwardly tapering trip arm or nose portion 27, the former bounded along an outer edge by an arcuately convex camming or wedging surface 26 and the latter having at its outer end a tip 28. The trip arm 27, in the locking position of the pawl 18, shown in FIG. 2, has a suitably flat upper edge 29 common to itself and the cam portion 25 and a lower edge 30 with also preferably is flat adjacent its intersection with the upper edge at the tip 28.

Eccentrically mounted and counterweighted by having its center of gravity or overweighting on the cam portion side of its pivotal axis, the pawl 18, while intended to contact or engage the operating shaft 12, is neither required nor intended to contact any other part of or movable with the gate 2. Since, as shown, the maximum radial projection of the pawl from its pivotal axis is along the camming surface 26, the preferred pawl as a whole is contained vertically above the level of any part of the gate, inwardly of the shaft, by which it may be confronted. Over the gate's range of movement, the pawl thus engages the shaft but clears the balance of the structure movable rectilinearly therewith.

Terminating at its upper end in the common upper edge 29, the camming surface 26, at its opposite or lower end, terminates in a substantially radially extending, instanding shoulder or abutment 31 inwardly intersecting or merging with the lower edge 30 of the trip arm 27. Intermediate its ends, the camming surface 26, in an upward direction toward the upper edge 29 and away from the operating shaft 12, progressively recedes from the pivotal axis, with corresponding upward widening of the cam portion 25.

The shoulder 31, like the cam portion 25 and trip arm 27, is of such radial extent as to be adapted to be swung downwardly into the path of movement of the operating shaft 12. However, in so swinging, these members are differently related to the shaft. In their downward positions, the cam portion and trip arm are adapted to engage or contact an outer or front side of the operating shaft, the cam portion in the gate's closed position and the trip arm as the gate is moved or driven from that position toward open position. Conversely, in downward position, the shoulder 31 is adapted to engage or contact the inner or rear side of the shaft as the gate in a closing operation approaches closed position. To produce these relationships, the radial extent of the camming surface 26 is made such, relative to the spacing between the pawl's pivotal axis and confronting outer side of the operating shaft in the gate's closed position, that, when the cam portion is swung downwardly with the gate in closed position, the shoulder 31 and adjoining lower end portion of the camming surface will clear the operating shaft and contact of the operating shaft with the camming surface will be made intermediate or between the latter's ends. In the same position of the gate, the trip arm, in its downward position, will be positioned or disposed forwardly or outwardly of the operating shaft.

With the counterweighting or center of gravity of the pawl on the cam portion side of its pivotal axis, were the pawl not restrained in its swing, the cam portion would depend below the pivotal axis regardless of the direction in which the pawl were swung. However, by restraining the palw's swinging, not only is the cam portion enabled at one time to be held above the pivotal axis, but the pawl, on release, when the gate is to be opened, is enabled to act automatically in locking the gate in closed position at the end of the following closing operation.

The restraint for enabling the pawl to act in the above manner is imposed by a pair of lugs 32 on and fixed to or rigid with and extending across and outstanding laterally from opposite sides of the trip arm 27 on that arm's side of the pivot pin 24. Laterally overlapping the bracket arms 21, the lugs conveniently are recessed intermediate their ends to accommodate the ends of those arms and each lug has at opposite ends a pair of stops 33 alternatively engagable with the upper and lower edges 34 of the bracket arms. As shown in solid line in FIG. 3, engagement of one set of the lug stops 33 with the lower edges 34 of the bracket arms 21, holds the pawl in tripping position with its cam portion uppermost and its center of gravity outwardly or forwardly of its pivotal axis and the trip arm 27 in downward position for engagement with the outer side of the operating shaft 12 in an opening operation. At the opposite extreme or limit of its swing, the pawl is in the tripped position shown in dotted line in the same figure, with the cam portion hanging below the pivotal axis and the shoulder 31 in position to engage the inner side of the operating shaft in a closing operation.

Figures 2, 3, 4:
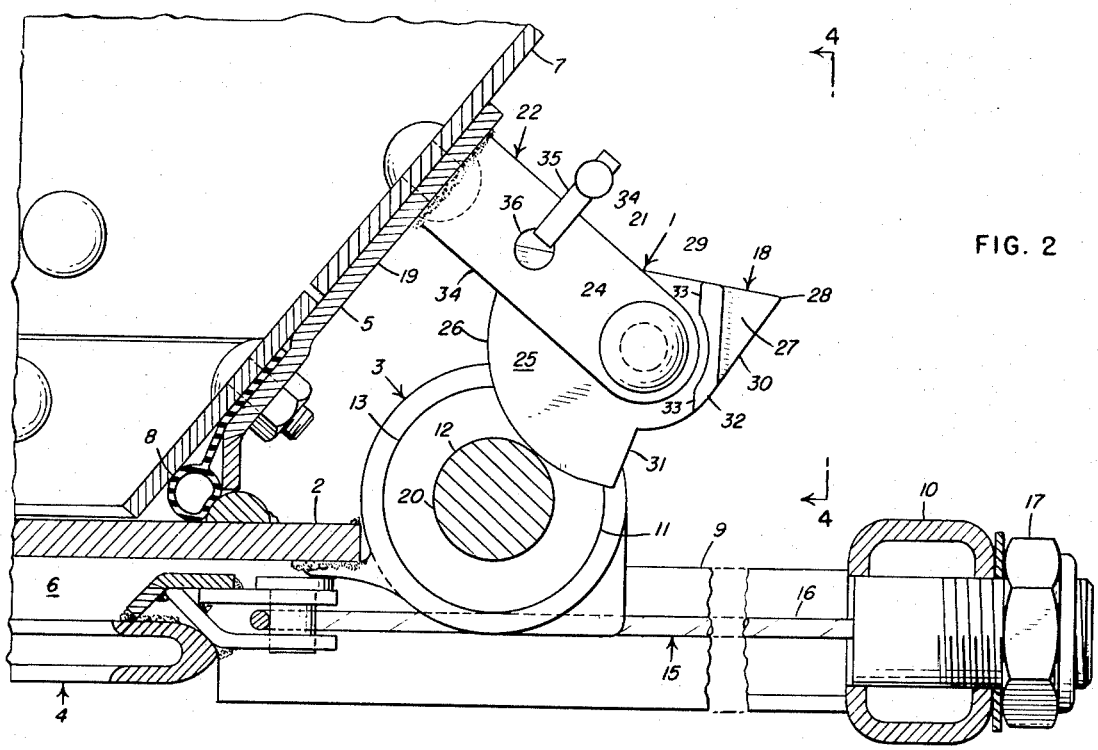
FIG. 2 is a fragmentary vertical sectional view on an enlarged scale taken along lines 2—2 of FIG. 1.
FIG. 3 is a fragmentary vertical sectional view on the scale of FIG. 2 taken along lines 3—3 of FIG. 1.
FIG. 4 is a plan view of the structure of FIG. 3.

In the operation of the locking mechanism 1, the pawl 18 in its locking position, shown in FIG. 2, in which the gate 2 is closed, will engage the outer side of the operating shaft 12 with its camming surface 26 intermediate the latter's ends and, because of the progressive upward widening of the cam portion 25, not only will positively lock the gate against opening but will automatically compensate for any wear in either the camming surface or the part of the operating shaft presented thereto. A seal 35 passed above the upper edge 29 of the pawl through aligned apertures or holes 36 in the bracket arms 21 rearwardly or inwardly of the pivot pin 24, effectively indicates whether the locking mechanism has been tampered with prior to unloading at the intended destination.

When the lading is to be unloaded, the seal 35 is broken and a strike, tap or blow by a pry bar or other suitable tool (not shown) on the upper edge 29 of the trip arm 27 swings the pawl to the release or tripping position shown in solid line in FIG. 3. As the gate 2 thereafter is driven toward open position by the cable drive 3, the operating shaft, by contacting or striking the then-presented lower edge 30 of the trip arm 27, will trip the pawl to the tripped position at the other limit of its swing, shown in dotted line in that figure, the shoulder 31 in process swinging over the operating shaft to a position inwardly or rearwardly thereof. In a subsequent closing operation the operating shaft 12, as the gate approaches closed position, will contact and slide along the shoulder 31 until it is clear thereof, in process swinging the shoulder and cam portion 25 upwardly but insufficiently to move the center of gravity of the pawl forwardly of its pivotal axis. Consequently, immediately the shaft has cleared the shoulder, the cam portion will swing downwardly by gravity to engage the camming surface 26 with the outer side of the shaft and this swing will continue until the pawl assumes the locking position shown in FIG. 2 when the gate has reached its closed position.

From the above detailed description it will be apparent that there has been provided an improved locking mechanism for a cable drive gate of a railway hopper car which automatically locks the gate in closed position and depends for its automatic operation only upon contact with the operating shaft. It should be understood that the described and disclosed embodiment is merely exemplary of the invention and that all modifications are intended to be included that do not depart from the spirit of the invention and the scope of the appended claims.

Having now described my invention, I claim:

1. The combination, with a railway hopper car discharge gate driven between open and closed positions in a gate frame by a cable drive including an operating shaft rotatably mounted on and extending across an outer end of the gate and riding on spaced guide rails, of locking mechanism comprising a counter-weighted pawl mounted outwardly of the frame for vertical pivoting about a pivotal axis disposed parallel to the operating shaft and positioned above and outwardly thereof in the closed position of the gate, spaced cam and trip means on said pawl and alternately swingable into the path of movement and engagable with an outer side of the shaft respectively for locking the gate in closed position and tripping said pawl in an opening operation for positioning said cam means for automatically reengaging the shaft on subsequent closing of the gate, and stop means on said pawl and engagable with means fixed to said frame for holding said cam means in shaft re-engaging position during movement of said shaft outwardly thereof.

2. The combination according to claim 1, wherein the operating shaft extends and the pawl is contained vertically above the level of any surface on the gate inwardly of the shaft and confronting the pawl during opening and closing movements of the gate.

3. The combination according to claim 2, including shoulder means on the pawl and on tripping of the pawl swung over the shaft into a position in the path of movement thereof for engagement with an inner side of said shaft on a subsequent closing operation to enable the shaft to swing the cam means out of the way in moving under the pawl toward closed position.

4. The combination according to claim 3, including bracket means fixed to and projecting outwardly from the gate frame and mounting the pawl, and spaced stop means on the pawl and alternately engagable with said bracket means, said stop means cooperating with the counterweighting of the pawl for alternately holding the pawl in tripping and tripped positions.

5. The combination according to claim 4, wherein the camming and tripping means are respectively a cam portion and a trip arm at opposite sides of the pivotal axis, the center of gravity of the pawl is on the cam portion side of the axis, the cam portion has on the periphery thereof a camming surface engagable with the shaft, the cam portion intermediate ends thereof progressively increases in width in an upward direction relative to the shaft, and the trip arm has lower and upper edges respectively engagable with the shaft and strikable for releasing the shaft from the camming surface and swinging the pawl to tripping position.

6. The combination according to claim 5, wherein the cam portion and trip arm have a common upper edge, and including aperture means in said bracket means inwardly of the pivotal axis for passing a seal therethrough above said upper edge and sealing the pawl in locking position.

7. The combination according to claim 5, wherein the pawl is substantially centered laterally between the guide rails and confronts a central portion of the shaft.

* * * * *